C. J. L. MOORE.
VARIABLE SPEED GEARING.
APPLICATION FILED OCT. 11, 1912.
1,124,783.
Patented Jan. 12, 1915.
2 SHEETS—SHEET 1.
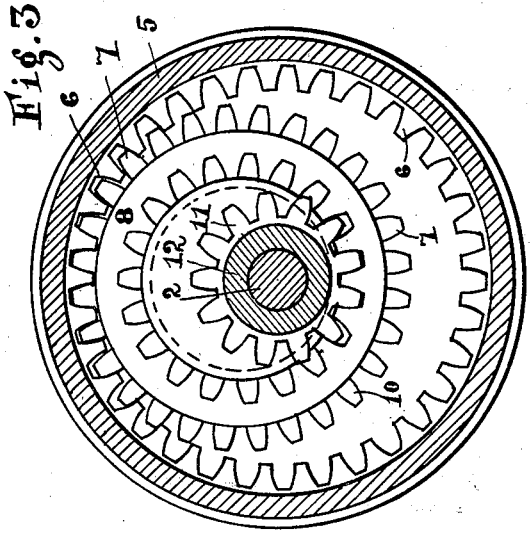
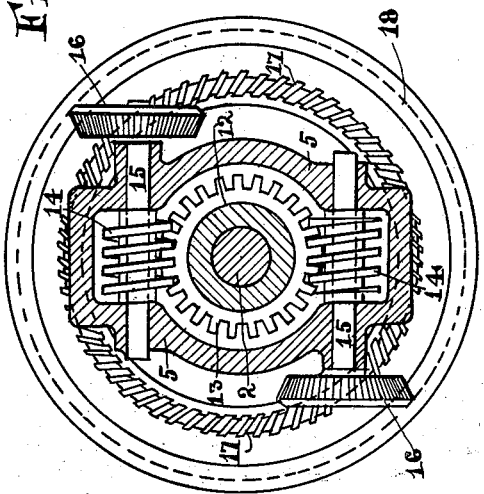
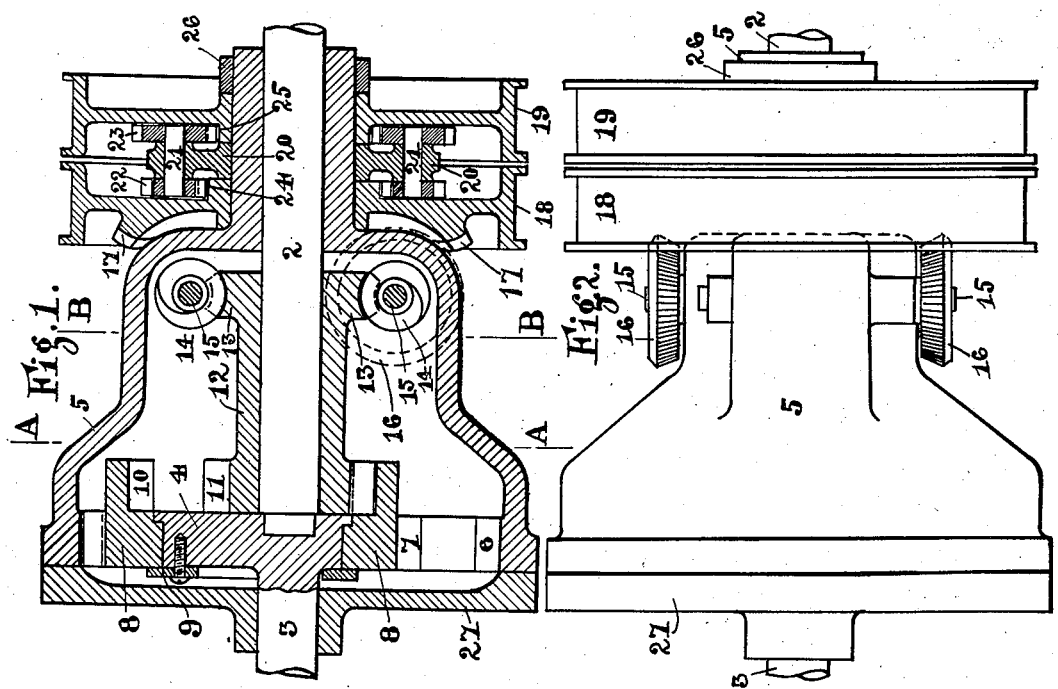
Witnesses
Robert I. Hulsizer
C. H. Potter
Inventor
Charles Josselyn Lay Moore
by Byrnes Townsend & Brickenstein
Attorneys C. J. L. MOORE.
VARIABLE SPEED GEARING.
APPLICATION FILED OCT. 11, 1912.
1,124,783.
Patented Jan. 12, 1915.
2 SHEETS—SHEET 2.
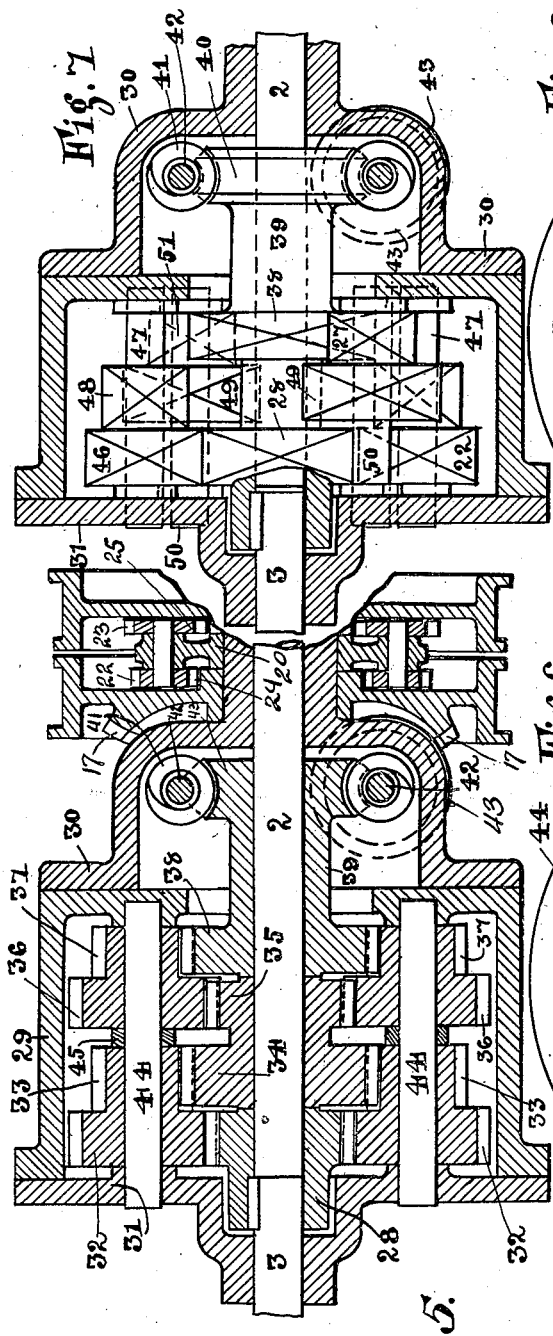
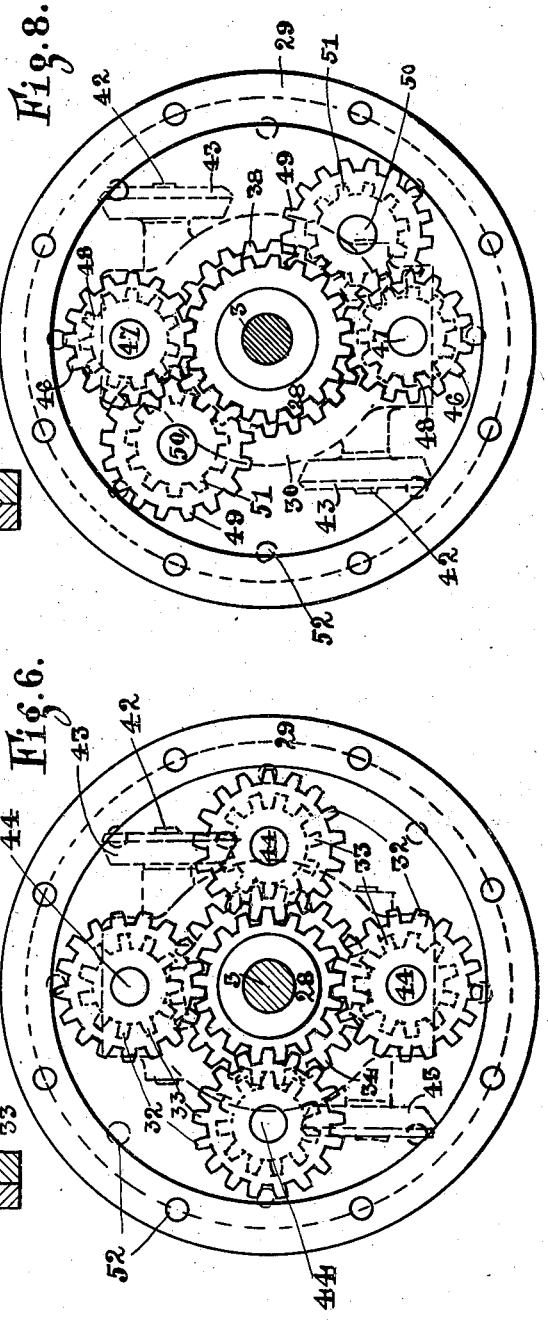
Witnesses
Robert J. Hulsizer.
C. H. Potter.
Inventor
Charles Josselyn Lay Moore
by Byrnes Townsend & Brickenstein
Attorneys

UNITED STATES PATENT OFFICE.

CHARLES JOSSELYN LAY MOORE, OF MERROW, NEAR GUILDFORD, ENGLAND.

VARIABLE-SPEED GEARING.

1,124,783.                 Specification of Letters Patent.      Patented Jan. 12, 1915.

Application filed October 11, 1912. Serial No. 725,149.

*To all whom it may concern:*

Be it known that I, CHARLES JOSSELYN LAY MOORE, a subject of the King of England, residing at Merrow, near Guildford, in the county of Surrey, in England, have invented certain new and useful Improvements in Variable-Speed Gearing, of which the following is a specification.

This invention relates to variable speed gearing particularly applicable for use with motor road vehicles and the like and of that type which include an eccentric and strap or epicyclic or sun and planet gearing systems between the driving and driven members, and means for controlling said strap or gearing, the construction being such that these elements may be restrained against axial rotation for direct drive between said driving and driven members or given a limited axial rotation for reducing speed between the members, or again given a higher axial rotation to render one member free of the other and finally given a still higher rotation to produce revolution in reverse directions between said members.

The invention consists in mounting the eccentric on the driven member and in forming the driving member with a revoluble casing provided with interior teeth gearing with exterior teeth on the eccentric strap, and in providing the latter with internal teeth which gear with a member in alinement with the driven member and controlled by epicyclic gearing.

The invention also comprises means for moving the strap faster on the eccentric than the casing will permit, to reverse the eccentric, and further to certain details of construction of controlling worm gear and brake drums.

The invention further consists in the combination of a sun-wheel rigidly mounted on the driven member, a system of planet wheels carried by a casing rigidly mounted on the driving member and certain of which gear with the sun-wheel, said planet wheels in turn gearing with other sun-wheels loosely mounted on said driving member or with spur wheels mounted exterior thereto and worm and worm wheel gearing co-acting with said other sun-wheels or with the spur wheels to effect the control of the axial rotation of said planet wheels.

The invention still further consists in the general combination and arrangement of parts constituting three embodiments of such variable speed gearing all as hereinafter fully described with reference to the accompanying drawings in which:

Figure 1 is a longitudinal central section of one embodiment of the improved speed gearing. Fig. 2 is a plan view of Fig. 1, Fig. 3 is a section on the line A—A of Fig. 1 looking toward the left. Fig. 4 is a section on the line B—B of Fig. 1 looking toward the right. Fig. 5 is a longitudinal vertical section of another embodiment of the improved gearing. Fig. 6 is an elevation of the left hand side of Fig. 5 with the casing cover removed, and Figs. 7 and 8 are similar views to Figs. 5 and 6 respectively of a third form of gearing.

Referring to Figs. 1 to 4 the driving shaft is designated by the character 2 and the driven shaft by 3. Fixed to or integral with the driven shaft 3 is an eccentric 4 and these parts are inclosed in a driving casing 5 fixed to the shaft 2 and having internal teeth 6 gearing with external teeth 7 on the strap 8 of the eccentric 4, said strap being held in place by a plate 9 screwed to the eccentric. The strap 8 is also provided with internal teeth 10 gearing with external teeth 11 on a sleeve 12, loosely mounted on the driving shaft 2 and having integral therewith a worm-wheel 13 with which mesh worms 14 on shafts 15 carried in bearings formed by the casing 5.

On the shafts 15 outside the casing are mounted bevel wheels 16 gearing with a bevel wheel 17 integral with a brake drum 18 loosely mounted on a boss extending from the casing 5. 19 designates a second brake drum also loosely mounted on said boss, and 20 a disk located between the brake drums and fixed to the boss, shafts 21 passing through said disk and carrying planet wheels 22, 23 keyed thereto. The wheels 22, 23 are of different diameters and mesh with sun-wheels 24 and 25 respectively on the brake drums 18 and 19.

26 designates a collar mounted on the boss outside the drums and 27 a cover for the open end of casing 5.

The operation of this gearing is as follows: When the brake drums 18 and 19 are both free the eccentric strap 8 will revolve with the casing 5 through the teeth 6 and 7 and since it cannot revolve on its axis owing to the sleeve 12 being held by the worms 14, the eccentric 4 is caused to revolve with the strap, thus imparting direct transmission to the driven shaft 3 and the whole mechanism revolves with driving shaft 2. If the drum 19 be held so that it revolves more slowly than the shaft 2, the planet wheels 22, 23 will be revolved upon their axes causing the speed of the drum 18 to be retarded. This retardation is transmitted through beveled wheels 17 16 to the worms 14 causing same to revolve and rotate the worm-wheel 13 and through same the sleeve 12 and teeth 11, which latter acting on the teeth 10 of strap 8 causes the latter to revolve on the eccentric 4 so that the latter will not revolve as quickly as previously, thus imparting a reduced speed to the driven shaft 3. By increasing the hold on or reducing the speed of drum 19 the speed of the shaft 3 is reduced until the strap 8 revolves on the eccentric 4 without imparting any motion thereto, thus giving "free engine" or similar effect. The proportions of the gearing are preferably so arranged that this result is obtained when the drum 19 is held from turning. If the drum 18 be held the worms 14 will rotate more quickly and the teeth 11 will attempt to turn the strap 8 faster on the eccentric 4 than the motion of the casing 5 will allow, thus causing the eccentric 4 to revolve in the reverse direction.

It will be apparent that by placing one or more brake drums adjacent to the drum 19, each provided with sun and planet wheels as between the drums 19 and 18, a variation in speed can be obtained as effectively as by relying on variation of load or pull by the brake strap on said drums 19 or 18.

Referring to Figs. 5 and 6 the character 2 also designates the driving shaft and 3 the driven shaft on which is keyed a sun-wheel 28. 29 designates a driving casing secured to the driving shaft 2 by means of the casing cover 30 fixedly mounted on said shaft, said casing being closed at its other end by a cover 31. Gearing with the sun-wheel 28 are four planet-wheels 32 integral with each of which is a planet-wheel 33 meshing with a sun-wheel 34 loosely mounted or free to revolve on the driving shaft 2. Integral with said sun-wheel 34 is a further sun-wheel 35 with which gear planet-wheels 36 and each having in one piece therewith a planet-wheel 37 meshing with a sun-wheel 38 integral with a sleeve 39 loosely mounted on the driving shaft 2. The sleeve 39 carries a worm wheel 40 with which engage worms 41 on shafts 42 having bearing in the aforesaid cover 30 and on said shafts are mounted bevel wheels 43 which gear with bevel wheels integral with brake drums as described above. The pairs of planet-wheels 32, 33 and 36, 37 are mounted on spindles 44 having bearing in the casing 29 and cover 31 and said pairs of wheels are separated by distance collars 45.

In the construction of Figs. 5 and 6 all the gearing between the sun-wheels 28 and 38 is of the sun and planet or epicyclic type as shown and described above but in the construction shown in Figs. 7 and 8 this gearing comprises a combination of epicyclic and ordinary spur gearing and comprises two planet-wheels 46 on shafts 47 and gearing with the sun-wheel 28, each of said planet-wheels having integral therewith a pinion 48 meshing with a spur-wheel 49 on a counter-shaft 50 and again integral with each of said spur-wheels 49 is a planet-wheel 51 which gears with the sun-wheel 38, the rest of the construction being similar to that described with reference to Figs. 5 and 6.

In Figs. 6 and 8, 52 designates holes for passage of bolts for securing the casing cover 31 in place. The operation of the gearings described is as follows:—If the worms 41 are not axially revolved or are prevented from revolving as described above the sleeve 39 is locked and prevented from revolving on the driving shaft 2 and in its turn prevents the wheel 38, 37, 36, 35, 34, 33 and 32 (Figs. 5 and 6) from revolving on their axes. The planet-wheels 32 thus cause the sun-wheel 28 on the driven shaft 3 to revolve at the same speed as the driving shaft 2 thus imparting a direct drive to said driven shaft 3, the whole of the mechanism revolving with the shaft 2. If the worms 41 are caused to revolve slowly the sleeve 39 and wheels 38, 37, 36, 35, 34, 33 and 32 will revolve on their respective axes, the gearing being so arranged and proportioned that the planet-wheels 32 are revolved on the spindles 44 in the same direction as the driving shaft 2 is revolved, thus the said wheels 32 will not revolve the sun-wheel 28 so rapidly as previously and a reduced speed is imparted to the driven shaft 3.

By increasing the speed of the worms 41 the speed of the planet-wheels 32 is increased until they travel around the sun-wheel 28 without imparting any motion thereto thus giving "free engine" or similar effect, and again if the speed of the worms is still further increased the planet-wheels 32 will cause the sun-wheel 28 to revolve in the opposite direction and reverse motion will be given to shaft 3. The same description as above applies also to the construction of Figs. 7 and 8 except that the wheels 51 49, 48 and 46 must be substituted for wheels 37, 36, 35, 34, 33 and 32 with wheels 46 corresponding to wheels 32.

What I claim as my invention and desire to secure by Letters Patent of the United States is:—

1. In a variable speed gearing the combination with driving and driven members of an element on the driven member, a casing revoluble with the driving member, axially rotatable mechanism carried by said casing engaging the element on the driven member, and worm gearing in operative relation with said mechanism, whereby the latter may be restrained from axial rotation for direct drive between the driving and driven members, or given a limited axial rotation for reducing the relative speed of said members, or again given a higher axial rotation to render one member free of the other, and finally given a still higher rotation to produce revolution in reverse directions between said members.

2. In a variable speed gearing the combination with driving and driven members of an element on the driven member, a casing revoluble with the driving member, axially rotatable mechanism carried by said casing engaging the element on the driven member, worm gearing in operative relation with said mechanism, and a plurality of brake drums adapted to control said worm gearing whereby said mechanism may be restrained from axial rotation for direct drive between the driving and driven members, or given a limited axial rotation for reducing the relative speed of said members, or again given a higher axial rotation to render one member free of the other, and finally given a still higher rotation to produce revolution in reverse directions between said members.

3. In a variable speed gearing the combination with driving and driven members of an element on the driven member, a casing revoluble with the driving member, axially rotatable mechanism carried by said casing engaging the element on the driven member, worm gearing in operative relation with said mechanism, a plurality of brake drums, one of which is geared to the worm gearing, and planet gearing between adjacent drums whereby said mechanism may be restrained from axial rotation for direct drive between the driving and driven members, or given a limited axial rotation for reducing the relative speed of said members, or again given a higher axial rotation to render one member free of the other and finally given a still higher rotation to produce revolution in reverse directions between said members.

4. In a variable speed gearing the combination of a driving member, a driven member, a sun wheel mounted rigidly on the driven member, a casing revoluble with the driving member, a system of planet wheels carried by said casing, certain of which mesh with said sun-wheel, a system of gears independent of said driving member meshing with the remainder of said planet-wheels, and worm gearing in operative relation with said system of gears, whereby said planet-wheels are restrained from axial rotation for direct drive between the driving and driven members, or given a limited axial rotation for reducing the relative speed of said members, or again given a higher axial rotation to render one member free of the other, and finally given a still higher rotation to produce revolution in reverse directions between said members.

5. In a variable speed gearing the combination of a driving member, a driven member, a sun-wheel mounted rigidly on the driven member, a casing revoluble with the driving member, a system of planet-wheels carried by said casing certain of which mesh with said sun-wheel, a system of gears independent of said driving member meshing with the remainder of said planet-wheels, worm gearing in operative relation with said system of gears, and a plurality of brake drums adapted to control said worm gearing, whereby said planet-wheels are restrained from axial rotation for direct drive between the driving and driven members, or given a limited axial rotation for reducing the relative speed of said members, or again given a higher axial rotation to render one member free of the other, and finally given a still higher rotation to produce revolution in reverse directions between said members.

In witness whereof I have signed this specification in the presence of two witnesses.

CHARLES JOSSELYN LAY MOORE.

Witnesses:
S. FORD,
O. J. WORTH.